United States Patent

Horiuchi et al.

[11] Patent Number: 5,229,544
[45] Date of Patent: Jul. 20, 1993

[54] ROTARY CONNECTOR

[75] Inventors: Naoaki Horiuchi, Tokyo; Michio Abe, Aichi, both of Japan

[73] Assignee: The Furukawa Electric Co., Ltd., Tokyo, Japan

[21] Appl. No.: 780,020

[22] Filed: Oct. 21, 1991

[30] Foreign Application Priority Data

Oct. 24, 1990 [JP] Japan .............................. 2-111242[U]

[51] Int. Cl.$^5$ ............................................. H05K 5/00
[52] U.S. Cl. ..................................... 174/52.1; 439/13; 439/278
[58] Field of Search ....................... 439/18, 13, 19, 20, 439/22, 23, 27, 28, 29, 278, 279, 281, 282, 367; 174/52.1; 361/380, 390

[56] References Cited

U.S. PATENT DOCUMENTS 4,936,782 6/1990 Bannai et al.
5,106,306 4/1992 Ditzig ..................................... 439/26
5,151,042 9/1992 Okada ................................... 439/169

FOREIGN PATENT DOCUMENTS 0243047 10/1987 European Pat. Off.

Primary Examiner—Leo P. Picard
Assistant Examiner—Bot Ledynh
Attorney, Agent, or Firm—Frishauf, Holtz, Goodman & Woodward

[57] ABSTRACT

A rotary connector is provided which includes a rotatable case having an inner cylindrical shaft, a fixed case having an engaging portion engaged with an end portion of the inner cylindrical shaft and coupled with the rotatable case with a clearance therebetween, and a spirally wound flat cable housed in the fixed and rotatable cases, the flat cable being allowed to loosen and tighten to thereby permit a predetermined number of rotations of the rotatable case relative to the fixed case. A projection protruding radially inward is provided at the engaging portion, such that a radially extending clearance is defined between the projection and the end portion of the inner cylindrical shaft.

7 Claims, 4 Drawing Sheets

ROTARY CONNECTOR

BACKGROUND OF THE INVENTION

1. Field of the Invention

This invention relates to a rotary connector for connecting relatively rotatable members.

2. Description of the Related Art

Among various rotary connectors for connecting relatively rotatable members, a rotary connector used in an automotive air bag is known, for example. This type of rotary connector comprises a fixed case constituted by a base plate and an outer cylindrical case, an inner cylindrical case (rotatable case) rotatably coupled with the fixed case, and a flexible flat cable wound in spiral form and arranged in an annular space defined by the fixed and rotatable cases. Each of the cases is produced by molding a synthetic resin.

This rotary connector is required to provide smooth rotation for a long time after it is mounted to an automotive vehicle. To this end, in conventional rotary connectors, a small clearance is defined between the rotatable case and the fixed case, to prevent the interference between the cases and thereby ensure smooth rotation. For example, in a conventional arrangement, a clearance extending vertically along the axis of rotation of the rotary connector is provided at a portion at which the lower part of the inner cylindrical case engages the base plate.

Usually, however, rotary connectors of this type are fixed to a vehicle body side with a steering column passed through the center of the inner cylindrical case serving as the rotatable case. Accordingly, if a clearance extending along the axis of rotation exists between the base plate and the inner cylinder case, grease or dust is likely to enter the case from parts arranged nearby, such as a combination switch, due to vibration of the vehicle body.

Grease or dust that has entered the case adheres to the base plate, inner cylindrical case, flat cable, etc., and smooth rotation of the rotary connector is hindered after long use.

SUMMARY OF THE INVENTION

An object of this invention is to provide a rotary connector which can reduce the entry of grease or dust and can provide smooth operation for a long time.

To achieve the above object, there is provided according to this invention a rotary connector including a rotatable case having an inner cylindrical shaft, a fixed case having an engaging portion engaged with an end portion of the inner cylindrical shaft and coupled with the rotatable case with a clearance therebetween, and a spirally wound flat cable housed in the fixed and rotatable cases, the flat cable being allowed to loosen and tighten to thereby permit a predetermined number of rotations of the rotatable case relative to the fixed case, wherein a projection protruding radially inward is provided at the engaging portion, such that a radially extending clearance is defined between the projection and the end portion of the inner cylindrical shaft.

In the rotary connector according to this invention, a radially extending clearance is defined between the projection and the end portion of the inner cylindrical shaft. Therefore, when the vehicle body vibrates, grease or dust scarcely enters the case from surrounding parts, and accordingly, smooth operation of the rotary connector is ensured for a long time.

The above and other objects, features, and advantages of this invention will become apparent from the ensuing detailed description taken in conjunction with the accompanying drawings.

DETAILED DESCRIPTION OF THE PREFERRED EMBODIMENTS

Embodiments of this invention will be described with reference to FIGS. 1 through 6.

Figure 1:
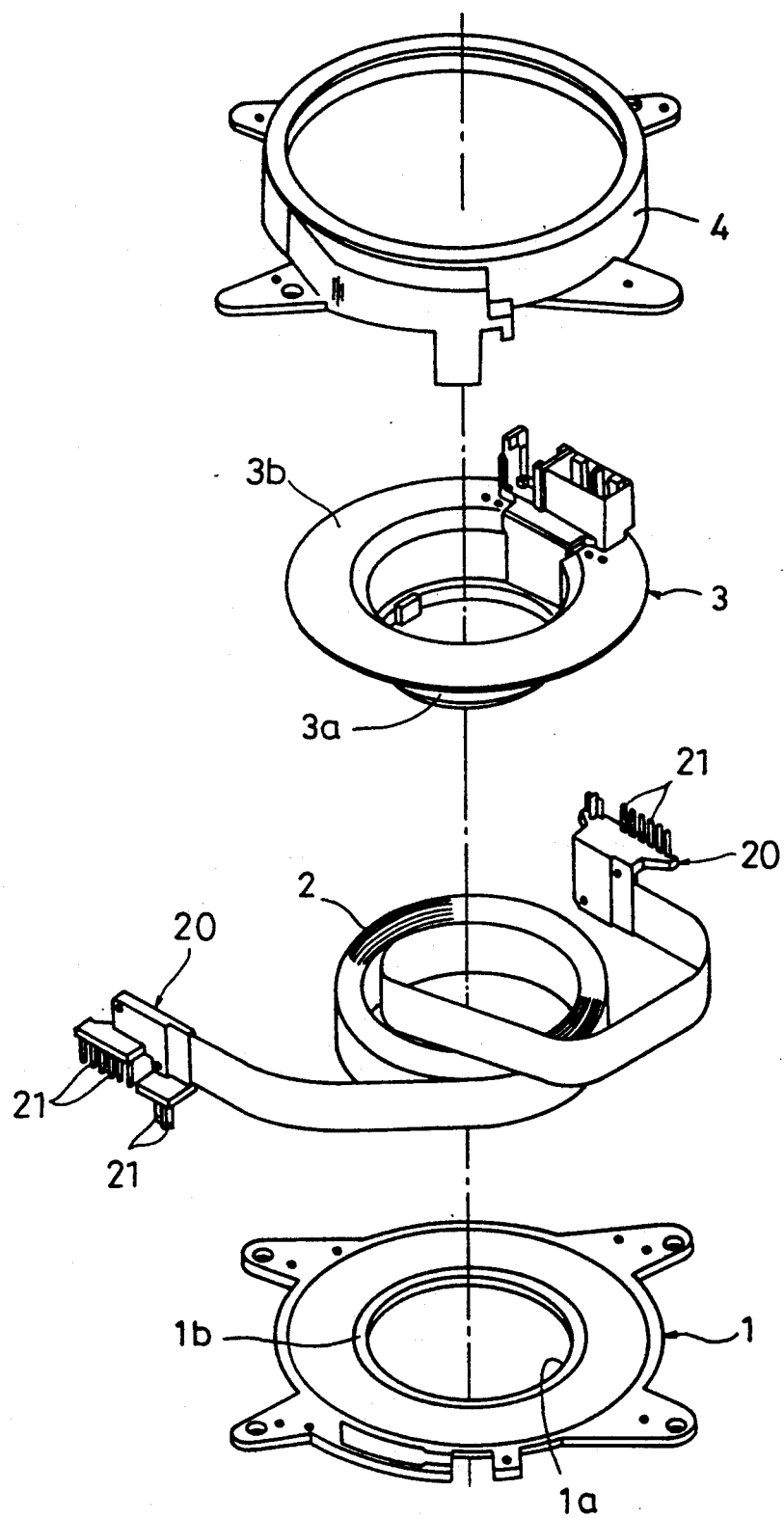
FIG. 1 is a perspective view of a rotary connector according to one embodiment of this invention, illustrating how the rotary connector is assembled.

As shown in FIG. 1, a rotary connector comprises a base plate 1 having an opening 1a in the center thereof, a flexible flat cable 2 wound in spiral form, an inner cylindrical case 3 having an inner cylindrical shaft 3a and a flange 3b extending radially outward from an upper portion of the inner cylindrical shaft 3a, and an outer cylindrical case 4. The elements 1, 2, 3, and 4 are put one upon the other in the order mentioned. The base plate 1 and the outer cylindrical case 4 constitute a fixed case, and the inner cylindrical case 3 serves as a rotatable case.

Figure 4:
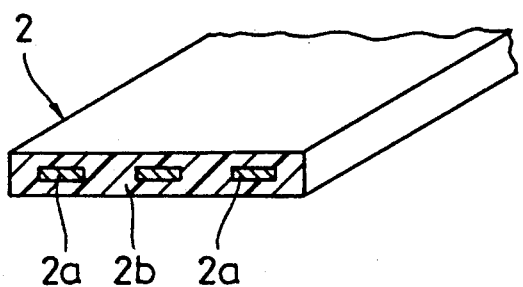
FIG. 4 is a perspective sectional view of a flat cable.
Figure 5:
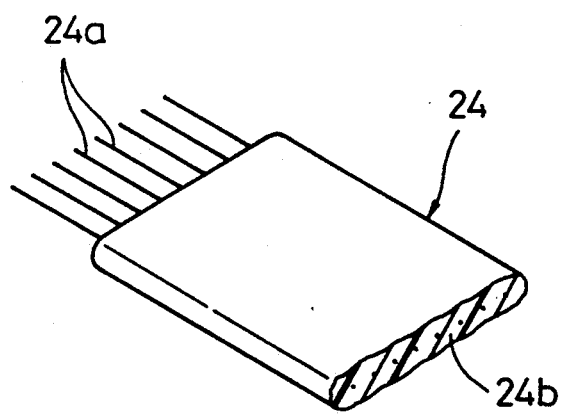
FIG. 5 is a perspective view showing another example of the flat cable.
Figure 6:
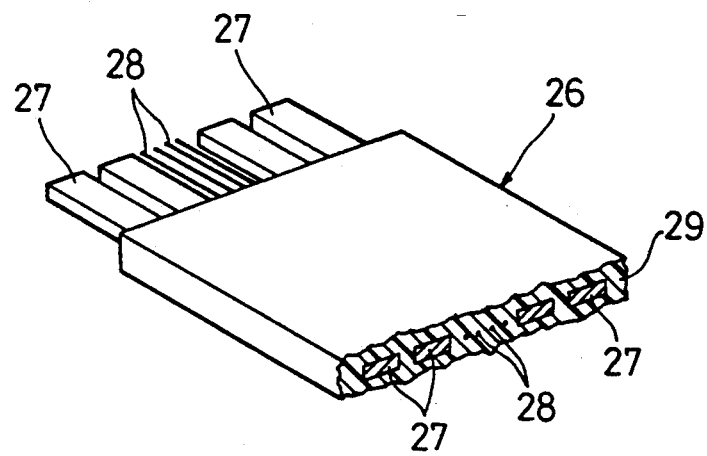
FIG. 6 is a perspective view showing still another example of the flat cable.

As shown in FIG. 4, the flat cable 2 is a flexible tape wire having a plurality of electrical conductors 2a covered together with an insulating material 2b, and a molded part 20 is provided at each end of the spirally wound cable 2, as shown in FIG. 1. Each molded part 20 is formed by molding a synthetic resin together with a plurality of tabs 21 connected to the electrical conductors 2a.

Figure 2:
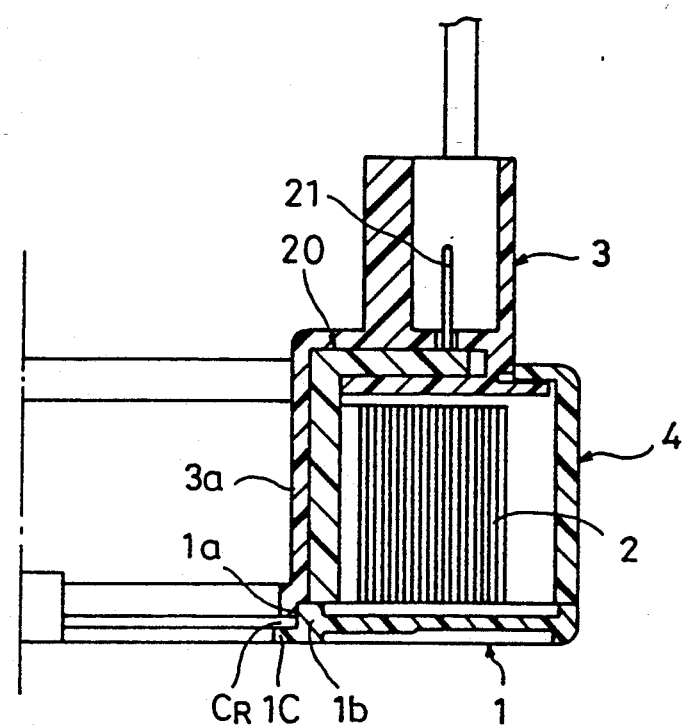
FIG. 2 is a sectional view of a principal part of the rotary connector, showing particularly a projection formed at an engaging portion of a fixed case.

According to the rotary connector of this invention, an engaging portion 1b of the base plate 1 at which the base plate 1 engages a lower end of the inner cylindrical shaft 3a has a radially inward projection 1c formed integrally therewith, as shown in FIG. 2.

The distance between the projection 1c and the lower end of the inner cylindrical shaft 3a is preferably 1 mm or thereabout. If this distance is greater, grease or dust is likely to enter the cases, and if the distance is smaller, the rotatable case interferes with the fixed case, and therefore, smooth operation of the rotary connector is hindered.

In the above rotary connector, the flange-like projection 1c is formed integrally with the engaging portion 1b. Accordingly, when the rotary connector is assembled, as shown in FIG. 2, a clearance $C_R$ extending in the radius direction is defined between the projection 1c of the base plate 1 and the lower end of the inner cylindrical shaft 3a of the inner cylindrical case 3.

When the rotary connector is in use after mounted to an automotive vehicle, it is subject to vibration as the vehicle runs, producing other clearances between the cases. However, since the clearance $C_R$ extends in the radius direction, it serves as a labyrinth seal, together with the other clearances between the base plate 1 and the inner cylindrical case 3 produced due to vibration, and therefore, grease or dust scarcely enters the cases.

Accordingly, smooth operation of the rotary connector can be retained for a long time.

Figure 3:
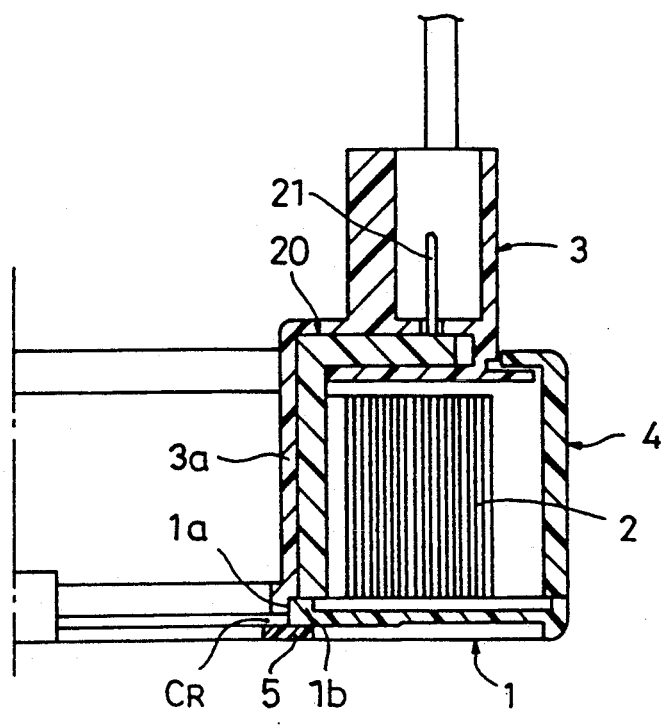
FIG. 3 is a sectional view of a principal part of a rotary connector according to another embodiment of this invention, in which a projection comprising a ring member is provided at the engaging portion of the fixed case.

Alternatively, according to another embodiment of this invention, a ring member 5 having a larger outer diameter and a smaller inner diameter than the opening 1a may be attached to the lower surface of the engaging portion 1b of the base plate 1, as shown in FIG. 3.

This ring member 5, when attached to the lower surface of the engaging portion 1b, forms a radially inward projection as illustrated. Accordingly, when the rotary connector is assembled, a clearance $C_R$ extending in the radius direction is defined between the ring member 5 and the lower end of the inner cylindrical shaft 3a.

Therefore, as in the preceding embodiment, clearances between the rotatable case and the fixed case made due to vibration of the rotary connector altogether act as a labyrinth seal, and the entry of grease or dust can be effectively prevented because the clearances do not extend in the radius direction.

The ring member 5 may be of any material, such as rubber, synthetic resin, or metal, as long as a proper clearance $C_R$ is defined between the ring member 5 and the lower end of the inner cylindrical shaft 3a.

The foregoing embodiments are described with reference to a flat cable for transmitting electricity, but flat cables of other types may be used. For example, the flat cable may be a tape cable 24 shown in FIG. 5, which has a plurality of optical fibers 24 embedded in a covering 24b of synthetic resin, or a composite cable 26 shown in FIG. 6, which has a plurality of electrical conductors 27 and a plurality of optical fibers 28 covered together with an insulating material 29.

What is claimed is:

1. In a rotary connector including a rotatable case having an inner cylindrical shaft, a fixed case having an engaging portion engaged with an end portion of the inner cylindrical shaft and coupled with the rotatable case with a clearance therebetween, and a spirally wound flat cable housed in the fixed and rotatable cases, the flat cable being allowed to loosen and tighten to thereby permit a predetermined number of rotations of the rotatable case relative to the fixed case, the improvement comprising a projection provided at the engaging portion and protruding radially inward, such that a radially extending clearance is defined between the projection and the end portion of the inner cylindrical shaft.

2. A rotary connector according to claim 1, wherein said projection is formed integrally with the engaging portion of the fixed case.

3. A rotary connector according to claim 1, wherein said projection comprises a ring member attached to a lower surface of the engaging portion of the fixed case.

4. A rotary connector according to claim 1, wherein said clearance defined between the projection and the end portion of the inner cylindrical shaft is about 1 mm.

5. A rotary connector according to claim 1, wherein said flat cable comprises an electrical transmission line having a plurality of electrical conductors covered with an insulating material for transmitting an electrical signal.

6. A rotary connector according to claim 1, wherein said flat cable comprises an optical transmission line having a plurality of optical fibers for transmitting an optical signal.

7. A rotary connector according to claim 1, wherein said flat cable comprises a composite transmission line having a plurality of electrical conductors for transmitting an electrical signal and a plurality of optical fibers for transmitting an optical signal, covered together with an insulating material.

* * * * *